(12) United States Patent
Bucklew et al.

(10) Patent No.: US 8,785,811 B2
(45) Date of Patent: Jul. 22, 2014

(54) SYSTEM AND METHOD FOR EFFICIENT LASER PROCESSING OF A MOVING WEB-BASED MATERIAL

(75) Inventors: James J. Bucklew, Somerset, WI (US); Kurt Hatella, New Richmond, WI (US)

(73) Assignee: Preco, Inc., Somerset, WI (US)

( * ) Notice: Subject to any disclaimer, the term of this patent is extended or adjusted under 35 U.S.C. 154(b) by 637 days.

(21) Appl. No.: 12/892,335

(22) Filed: Sep. 28, 2010

(65) Prior Publication Data

US 2011/0073576 A1 Mar. 31, 2011

Related U.S. Application Data

(60) Provisional application No. 61/246,730, filed on Sep. 29, 2009.

(51) Int. Cl.
*B23K 26/38* (2014.01)
*B23K 26/08* (2014.01)

(52) U.S. Cl.
CPC ............ *B23K 26/38* (2013.01); *B23K 26/0807* (2013.01); *B23K 26/0846* (2013.01)
USPC ................................. 219/121.67; 219/121.72

(58) Field of Classification Search
USPC ............... 219/121.67, 121.72, 121.7, 121.71, 219/121.8, 121.81, 121.68, 121.69, 121.74
See application file for complete search history.

(56) References Cited

U.S. PATENT DOCUMENTS 3,226,527 A * 12/1965 Harding ...................... 219/121.7
3,582,466 A * 6/1971 Quirk ........................ 219/121.67
3,585,917 A   6/1971 Griffith
(Continued)

FOREIGN PATENT DOCUMENTS

GB     2357987 A  * 7/2001
JP     59-001082   * 1/1982
(Continued)

OTHER PUBLICATIONS

Translation of Japan Patent document No. 59-001,082, Feb. 2012.*
(Continued)

*Primary Examiner* — Geoffrey S Evans
(74) *Attorney, Agent, or Firm* — Westman, Champlin & Koehler, P.A.; Z. Peter Sawicki; Amanda Prose

(57) ABSTRACT

Systems and methods are described for efficient laser processing of a moving web-based material. In one embodiment, a moving web is provided at a selected speed. A laser beam is generated having a focal point positioned to provide either a score or cut in the web. The focal point of the laser beam is moved at a speed less than the selected speed for a selected distance thereby producing a discreet score or cut in the web in the machine direction. The focal point is repositioned to form another discreet score or cut once the prior discreet score or cut is formed. The repositioned focal point is moved at a speed less than the selected speed for another selected distance. The step of repositioning is repeated to form a plurality of discreet scores or cuts in the web moving at the selected speed. The laser beam is therefore able to be generated using less power than would be needed to produce the same type of discreet score or cut if the focal point were stationary as the web is moved at the selected speed.

26 Claims, 3 Drawing Sheets

(56) References Cited

U.S. PATENT DOCUMENTS

| | | | |
|---|---|---|---|
| 3,626,143 A * | 12/1971 | Fry | 219/121.69 |
| 4,028,525 A | 6/1977 | Mominee et al. | |
| 4,049,945 A * | 9/1977 | Ehlscheid et al. | 219/121.67 |
| 4,638,145 A | 1/1987 | Sakuma et al. | |
| 5,496,253 A | 3/1996 | Snellman et al. | |
| 5,653,900 A * | 8/1997 | Clement et al. | 219/121.68 |
| 5,736,710 A | 4/1998 | Ikeda et al. | |
| 6,049,057 A * | 4/2000 | Imai et al. | 219/121.7 |
| 6,177,648 B1 | 1/2001 | Lawson et al. | |
| 6,538,230 B2 | 3/2003 | Lawson | |
| 6,658,818 B2 * | 12/2003 | Kurth et al. | 53/426 |
| 2002/0170886 A1 * | 11/2002 | Lawson | 219/121.7 |
| 2003/0047695 A1 * | 3/2003 | Zik et al. | 250/559.32 |
| 2003/0051440 A1 * | 3/2003 | Chow et al. | 219/121.71 |
| 2004/0026384 A1 * | 2/2004 | Mueller et al. | 219/121.7 |
| 2006/0014616 A1 * | 1/2006 | Baggot et al. | 493/63 |
| 2007/0017908 A1 * | 1/2007 | Sercel et al. | 219/121.73 |
| 2007/0087096 A1 | 4/2007 | Mir | |

FOREIGN PATENT DOCUMENTS

| | | | |
|---|---|---|---|
| JP | 09-192869 A * | 7/1997 | |
| JP | 11245068 A | 9/1999 | |
| KR | 20080079828 A | 9/2008 | |
| KR | 20080113702 A | 12/2008 | |
| WO | 2009151901 A1 | 12/2009 | |

OTHER PUBLICATIONS

Machine translation of Japan Patent document No. 9-192,869, Jan. 2013.*
Abstract of JP11245068, Sep. 14, 1999.
Abstract of KR20080079828, Sep. 2, 2008.
Abstract of KR20080113702, Dec. 31, 2008.
PCT International Search Report, Jun. 24, 2011.
PCT Written Opinion, Jun. 24, 2011.

* cited by examiner

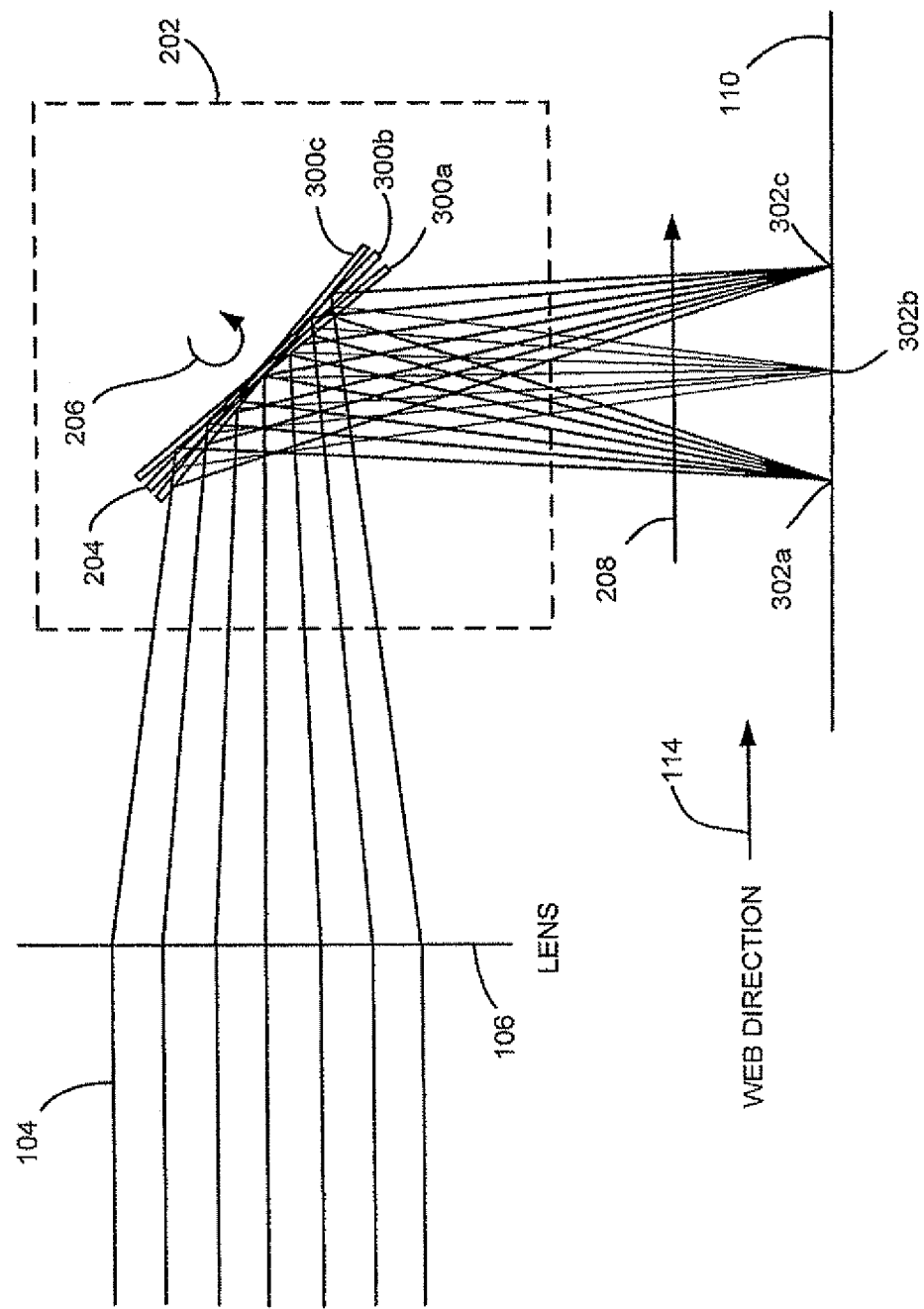

SYSTEM AND METHOD FOR EFFICIENT LASER PROCESSING OF A MOVING WEB-BASED MATERIAL

CROSS-REFERENCE TO RELATED APPLICATION

The present application is based on and claims the benefit of U.S. provisional patent application Ser. No. 61/246,730, filed Sep. 29, 2009, the content of which is hereby incorporated by reference in its entirety.

BACKGROUND

The present invention relates to steered laser beam systems, and more particularly to a system and method for efficient laser processing of a moving web-based material.

Laser systems typically use high-power laser beams for cutting, slitting, scoring, marking and other related laser processing of web-based materials. In many applications, a fixed laser beam is focused through a lens to cause local vaporization or degradation of the material as the material is moved relative to the focused laser beam.

For example, slits may be produced in a moving web-based material, such as a plastic film, using a $CO_2$ laser beam. A roll handler moves the plastic film under the focused laser beam in a linear direction, and an encoder monitors the speed of the material.

Unfortunately, many plastic films absorb only a fraction of the laser energy at $CO_2$ wavelengths and thus require significant laser power to create a slit in the material. As a result, there is an ideal power density/speed relationship for a given material of a given thickness. When the plastic film moves at slower speeds, a less powerful $CO_2$ laser is required to produce slits in the film because the laser is given a longer duration of time to produce each slit. However, when the plastic film moves at higher speeds, a more powerful $CO_2$ laser is required because the laser is given a shorter duration of time to produce each slit.

Therefore, there is a need in the art for a system and method for increasing the processing speed of the moving web-based material without increasing the required power density of the laser. Or similarly, there is a need in the art for a system and method for reducing the power density of the laser without sacrificing the processing speed of the moving web-based material.

SUMMARY

The present invention provides a system and method for efficient laser processing of a moving web-based material. In one embodiment, a moving web is provided at a selected speed. A laser beam is generated having a focal point positioned to provide either a score or cut in the web. The focal point of the laser beam is moved at a speed less than the selected speed for a selected distance, thereby producing a discreet score or cut in the web in the machine direction. The focal point is repositioned to form another discreet score or cut once the prior discreet score or cut is formed. The repositioned focal point is moved at a speed less than the selected speed for another selected distance. The step of repositioning is repeated to form a plurality of discreet scores or cuts in the web moving at the selected speed. The present invention therefore requires a laser beam of less power than would be needed to produce the same type of discreet score or cut if the focal point were stationary as the web is moved at the selected speed.

BRIEF DESCRIPTION OF THE DRAWINGS

FIG. 3 is a diagram of the galvanometer employed in the steered laser system shown in FIG. 2.

DETAILED DESCRIPTION OF ILLUSTRATIVE EMBODIMENTS

Described herein is a steered laser system for efficient laser processing of moving web-based materials, and associated methods. Generally, "laser processing" refers to cutting, slitting, scoring, marking and the like. All such types of laser processing are equally relevant, and the effect is achieved in the same way. "Moving web" generally refers to any material that can be continuously advanced under the laser beam. More specifically, "moving web" refers to any thin film material such as any plastic or cellulose film, paper or metal foil material.

Figure 1:
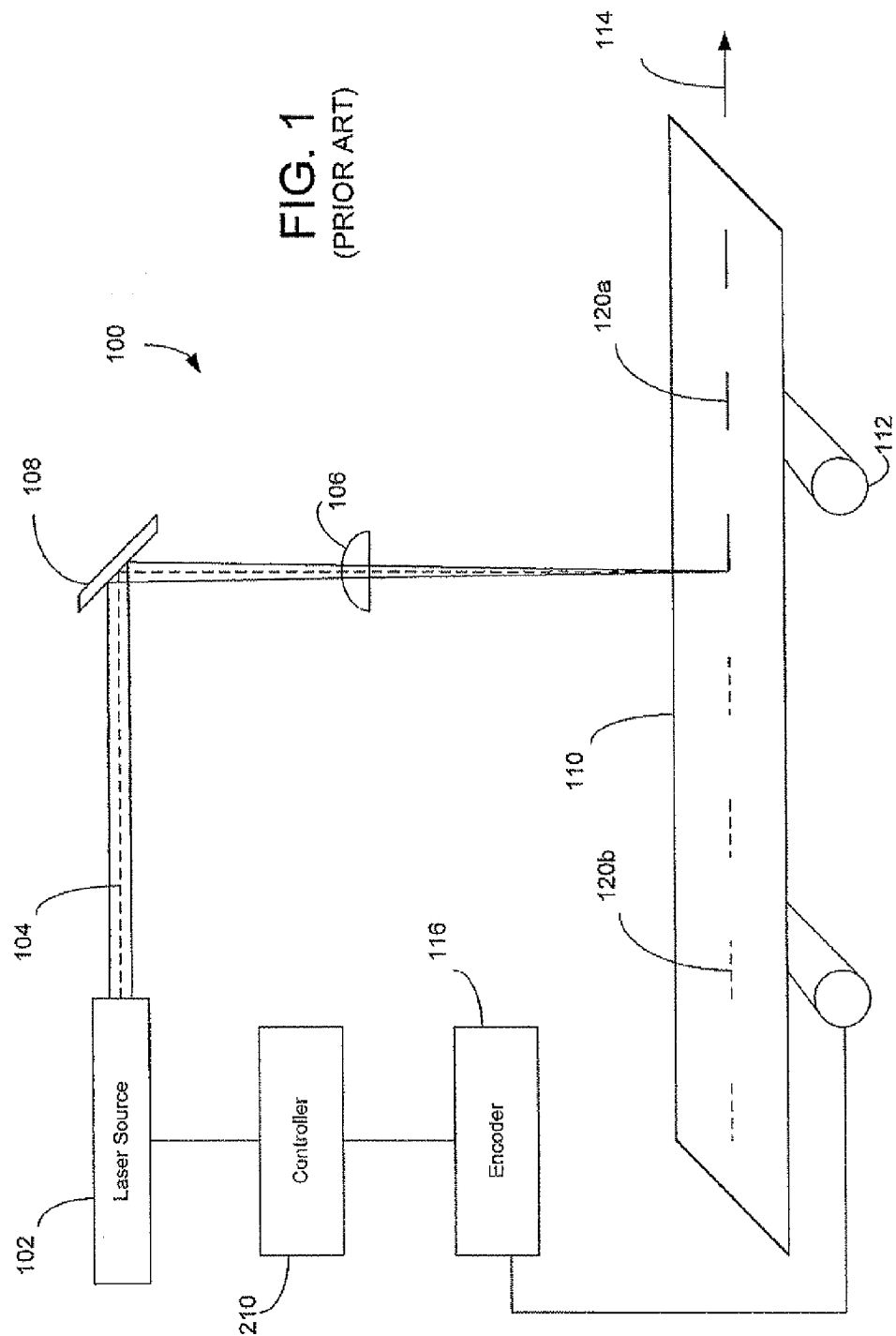
FIG. 1 is a diagram of a prior art laser system for processing a moving web-based material.

FIG. 1 shows a prior art laser system 100. A laser source 102 generates a laser beam 104, which is typically reflected by a fixed mirror 108 and focused by a lens 106 onto a moving web 110. The lens 106 focuses the laser beam 104 so that its focal point impinges upon the web 110. The web 110 is carried by rollers 112 or a similar advancement mechanism known in the art, moving in the direction indicated by arrow 114. An encoder 116 monitors the speed of advancement of the web 110, and a controller 210 controls the on-off timing of the laser source 102 to match a set slit pattern 120, which is represented in FIG. 1 as a group of processed slits 120a (shown as solid lines) and a group of yet-to-be-processed slits 120b (shown as dotted lines).

As discussed above in the Background, there is an ideal power density/speed relationship for a given material of a given thickness. If the power density of the laser beam 104 remains constant, then the speed of advancement of the web 110 cannot exceed an ideal speed x, which is the maximum speed of advancement in which each slit 120a can still be formed properly. This is because at speeds above the ideal speed x, the fixed laser beam 104 does not have sufficient time to transfer enough energy to the web 110 to process each slit 120a. Therefore, any increase in the advancement speed of the web 110 above the ideal speed x requires a corresponding increase in the power density of the fixed laser beam 104. In this way, the efficiency of the laser system 100 must be sacrificed because a more powerful laser source 102 must be used.

This disclosure addresses the problem associated with prior art laser systems by providing a system and method for moving the focal point of the laser beam in the same direction as the moving web when the speed of advancement of the web is higher than the ideal speed x. The "effective speed" of the moving web in relation to the focal point is therefore reduced by the speed of the focal point. As a result, it is possible for each slit to be processed at web advancement speeds significantly higher than the ideal speed x without increasing the required power density of the laser beam because the effective speed of the web with respect to the focal point is reduced.

Figure 2:
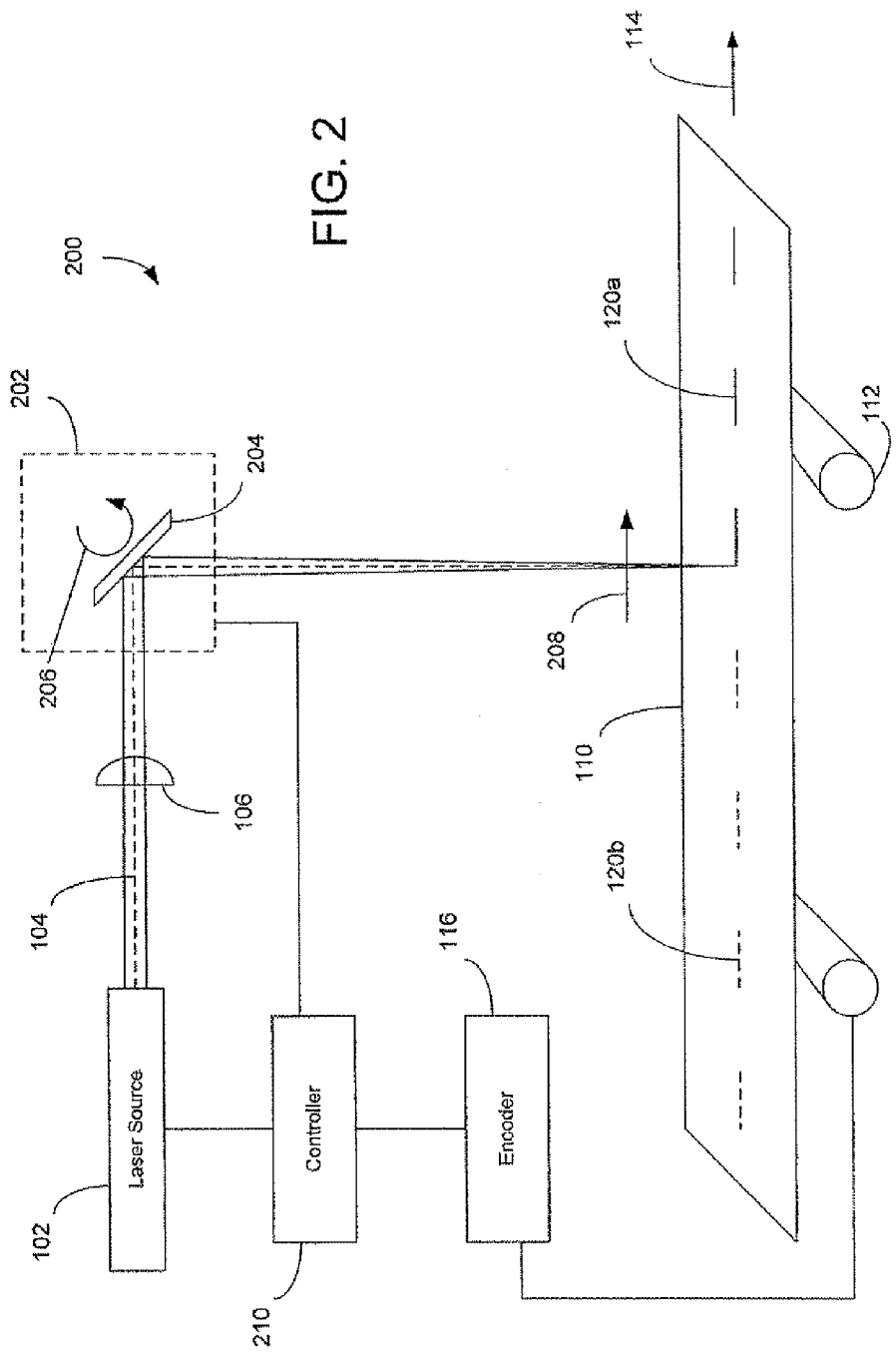
FIG. 2 is a diagram of a steered laser system for processing a moving web-based material according to an embodiment of the present invention.

FIG. 2 shows a steered laser system 200 according to an embodiment of this disclosure. The laser source 102 generates the laser beam 104, which is focused by the lens 106 so that its focal point impinges upon the moving web 110. The web 110 is carried by rollers 112 or a similar advancement mechanism known in the art, moving in the direction indicated by arrow 114. However, unlike prior art laser system 100 that utilizes a fixed mirror 108, the laser system 200 utilizes a galvanometer 202, or "galvo system", to reflect the laser beam 104 onto the moving web 110. The galvanometer 202 includes a rotating single-axis mirror 204 such that rotation of the mirror 204 around its axis in the direction indicated by arrow 206 results in linear movement, or "tracking", of the focal point of the laser beam 104 on the moving web 110 in the direction of arrow 208.

A controller 210 controls the on-off timing of the laser source 102 and the speed of rotation of the mirror 204 as a function of the speed of advancement of the web 110, so that the difference between the speed of advancement of the web 110 and the tracking speed of the focal point of the laser beam 104 on the web 110 is less than or equal to the ideal speed x. In other words, the effective speed of the web 110 in relation to the focal point is less than or equal to the ideal speed x. This enables each slit 120a to be fanned properly at web advancement speeds significantly higher than the ideal speed x without having to increase the power density of the laser beam 104. In this way, the laser system 200 is more efficient than prior art laser systems that require a more powerful laser source to process a moving web at speeds higher than the ideal speed x.

The speed of advancement of the web 110 is monitored by the encoder 116 so that the controller 210 can adjust the tracking speed of the focal point accordingly to maintain the effective speed of the web 110 in relation to the focal point at less than or equal to the ideal speed x. The maximum speed of advancement of the web 110 is then dictated by the length of slit required, the power density/speed relationship of the web 110 (material specific), and the tracking distance limit of the focal point.

FIG. 3 shows the operation of the single-axis galvanometer 202 from FIG. 2 in greater detail. The single-axis mirror 204 is shown rotating through three mirror positions 300a-c. At a first mirror position 300a, the mirror 204 provides a corresponding first focal point position 302a. As the mirror 204 rotates around its axis in the direction indicated by arrow 206, the focal point of the laser beam 104 moves in the direction of arrow 208. At a second mirror position 300b, the mirror 204 provides a corresponding second focal point position 302b. Finally, as the mirror 204 continues to rotate around its axis and reaches a third mirror position 300c, the mirror 204 provides a corresponding third focal point position 302c. In this way, the laser system 200 is able to move the focal point of the laser beam 104 in the same direction as the moving web 110, but at a speed less than that of the moving web 110, thereby reducing the effective speed of the moving web 110 in relation to the focal point.

Each slit 120a is formed when the controller 210 turns on the laser source 102 and rotates the mirror 202 in the direction of arrow 206 to move the focal point of the laser beam 104 in the same direction as the moving web 110, but at a speed less than the moving web 110, creating a net or 'effective' focal-point-to-web speed relationship less than or equal to ideal speed x. After each slit 120a is formed, the controller 210 turns off the laser source 102 and rotates the mirror 204 in the opposite direction of arrow 206 to reposition the focal point back to its initial position 302a. This process is repeated for each slit 120a as the moving web 110 is advanced under the laser beam 104 at speeds higher than the ideal speed x.

However, in producing a roll of processed film, the speed of the moving web 110 varies from 0 fpm (feet per minute) to the maximum speed above the ideal speed x. For web speeds less than or equal to the ideal speed x, the controller 210 adjusts the galvanometer 202 and the laser source 102 accordingly to allow the power density/speed relationship to remain constant. In one embodiment, the controller 210 causes the galvanometer 202 to keep the focal point fixed (no tracking) and causes the laser source 102 to reduce the power density of the laser beam 104 proportionally to the speed of the moving web 110.

In another embodiment, for web speeds less than the ideal speed x, the controller 210 causes the laser source 102 to keep the power density of the laser beam 104 constant and causes the galvanometer 202 to move the focal point opposite to the direction of arrow 208 to "counter sweep" against the direction of the moving web 110. By moving the focal point in the opposite direction of the moving web 110, and at a tracking speed proportional to the speed of the moving web 110, the controller 210 is able to maintain an effective speed of the web 110 in relation to the focal point at approximately the ideal speed x.

Depending on the desired scoring or cutting outcome, many variations of the presently disclosed method may be practiced, including variations in the speed of sweep of galvanometer 202, variations in the power density of the laser beam 104, variations in the direction(s) of sweep of galvanometer 202 before repositioning, and combinations thereof. Exemplary non-limiting examples are presented below.

Example 1

In one embodiment where it is desirable to have a deeper score in the middle of a slit 120a, the controller 210 varies the speed of sweep of galvanometer 202 so that the relative speed of the focal point is faster at the initial position 302a, slower at the second focal point position 302b, and then faster again at the third focal point position 302c. This results in a slit 120a having a deeper cut in the middle, thereby resulting in a well-defined point of weakness.

Example 2

In another embodiment where it is desirable to have a deeper score in the middle of a slit 120a, the controller 210 varies the power density of the laser beam 104 so that the relative power of the laser generated at the focal point is lower at the initial position 302a, higher at the second focal point position 302b, and then lower again at the third focal point position 302c. This also results in a slit 120a having a deeper cut in the middle, thereby resulting in a well-defined point of weakness.

Example 3

In yet another embodiment where it is desirable to have a deeper score, the controller 210 varies the direction of sweep of galvanometer 202 so that the focal point of laser beam 104 travels in both direction 208 and the direction opposite 208 while the laser beam 104 is "on" before repositioning for the next slit 120b. The overlap in focal point travel with such a bi-directional sweep results in a deeper cut than would a single pass at the same power density level. Particularly with such a bi-directional sweep, the speed at which galvanometer 202 moves the focal point of laser beam 104 may be faster than the speed of movement of web 110 so that the focal point of laser beam 104 may be repositioned for the next slit 120b without slowing the overall processing of web 110. It is to be understood that galvanometer 202 may move the focal point of laser beam 104 faster than the speed of movement of web 110 in other cases as well. Moreover, with such a bi-directional sweep, the speed at which galvanometer 202 moves the focal point of laser beam 104 may be different for each the two directions of the sweep; for example, the speed in direction 208 may be slower than x while the speed in the direction opposite 208 may be faster than x.

An exemplary application of where the laser system 200 may be utilized is in the production of venting slits in flexible packaging film for microwavable food products. Many food products today are sold in packages that allow the consumer to place the package directly into a microwave oven for heating. This requires the package to have some sort of venting mechanism to allow expanding steam to escape from the package in a semi-controlled fashion without compromising the integrity of the package overall. This can be achieved by utilizing the laser system 200 to produce slits or cuts through the packaging film. This can also be achieved by utilizing the laser system 200 to produce scores in the packaging film that are not cut completely through the film. For example, a score that is approximately 80% or 90% through the thickness of the packaging film maintains the barrier properties of the film, yet provides a venting port that opens upon minimal pressure inside the package (as when heating in a microwave oven). Another application for the disclosed methods is for the production of easily perforated films for "easy-open" features on packaging, for example.

Many of the packaging films used for microwavable food products consist primarily of polyethylene and are approximately 3 to 5 mils thick. The laser system 200 using a 100-watt $CO_2$ laser could process slits (approximately 0.25 inch long and 0.006 inch wide) in such a packaging film at over 800 fpm (feet per minute). However, the prior art laser system 100 using a fixed 100-watt $CO_2$ laser could only process the same slits in the same packaging film at just under 400 fpm. Thus, the laser system 200 would provide approximately a 200% improvement in processing efficiency.

The laser system 200 may be used to cut or score mono or co-extruded plastic films for a variety of different applications. Suitable materials include, but are not limited to, plastic or polymeric materials such as polyethylene (PE), linear and low-density polyethylene (LLDPE and LDPE), polyethyleneterephthalate (PET), oriented polypropylene (OPP), or other polymers. Generally, the present invention may be used with either multi-layer homogenous or non-homogenous film materials or single-layer film materials of uniform composition. Generally, any type of flexible packaging material may be laser cut or scored as taught by the present invention. For the purpose of this disclosure, the moving web 110 may be any flexible packaging material of either multiple layers of different compositions or a single layer of uniform composition. Finally, although the invention has been described with respect to a moving web-based material, the laser system 200 may also be applied to continuously moving discrete objects, sheets, or any other type of material on which laser processes are performed.

Although the present invention has been described with reference to preferred embodiments, workers skilled in the art will recognize that changes may be made in form and detail without departing from the spirit and scope of the invention.

What is claimed is:

1. A method for scoring or cutting a moving web to produce discreet scores or cuts in the web, the web moving in a machine direction, the method comprising:
providing the moving web at a selected speed;
generating a laser beam having a focal point positioned to provide either a score or cut in the web;
moving the focal point of the laser beam at a speed less than the selected speed for a selected distance thereby producing a discreet score or cut in the web;
repositioning the focal point to form another discreet score or cut once the prior discreet score or cut is formed and moving the repositioned focal point at a speed less than the selected speed for another selected distance;
repeating the step of repositioning to form a plurality of discreet scores or cuts in the web; and
wherein the laser beam is generated using less power than would be needed to produce a substantially similar discreet score or cut if the focal point were stationary as the web is moved at the selected speed.

2. The method of claim 1, wherein moving the focal point of the laser beam and moving the repositioned focal point are accomplished in the machine direction.

3. The method of claim 1, wherein the step of generating a laser beam having a focal point comprises providing a lens to focus the laser beam to create the focal point.

4. The method of claim 1, wherein the step of moving the focal point of the laser beam comprises:
providing a mirror to reflect the laser beam onto the moving web; and
rotating the mirror to cause movement of the focal point of the laser beam in the machine direction.

5. The method of claim 1, wherein the step of repositioning the focal point of the laser beam comprises:
providing a mirror to reflect the laser beam onto the moving web; and
rotating the mirror to cause movement of the focal point of the laser beam opposite to the machine direction.

6. The method of claim 1, further comprising:
monitoring the speed of the web; and
controlling the speed of the focal point as a function of the speed of the web.

7. The method of claim 1, further comprising:
monitoring the speed of the web; and
controlling a power density of the laser beam as a function of the speed of the web.

8. The method of claim 1, wherein the web comprises a plastic film.

9. The method of claim 1, wherein the laser beam comprises a $CO_2$ laser beam.

10. The method of claim 1, wherein the selected speed is x, corresponding to an ideal web movement speed for the web if the focal point was stationary.

11. A system for scoring or cutting a moving web to produce discreet scores or cuts in the web, the web moving in a machine direction, the system comprising:
a mechanism for moving the web at a selected speed;
a laser source for generating a laser beam;
a lens for focusing the laser beam to create a focal point;
a galvanometer for:
reflecting the focused laser beam to the web;
moving the focal point in the machine direction at a speed less than the selected speed for a selected distance thereby producing a discreet score or cut in the web; and
repositioning the focal point to form another discreet score or cut once the prior discreet score or cut is formed and moving the repositioned focal point at a speed less than the selected speed for another selected distance; and
wherein the laser beam is generated using less power than would be needed to produce the same type of discreet score or cut if the focal point were stationary as the web is moved at the selected speed.

12. The system of claim 11, wherein the mechanism for moving the web comprises a roller system.

13. The system of claim 11, wherein the galvanometer comprises:
   a mirror for reflecting the laser beam to the web; and
   a motor for rotating the mirror to cause movement of the focal point.

14. The system of claim 11, wherein the web comprises a plastic film.

15. The system of claim 11, wherein the laser beam comprises a $CO_2$ laser beam.

16. The system of claim 11, wherein moving the focal point and moving the repositioned focal point are accomplished in the machine direction.

17. The system of claim 11, wherein the selected speed is x, corresponding to an ideal web movement speed for the web if the focal point was stationary.

18. The system of claim 11, further comprising an encoder for monitoring the speed of the web.

19. The system of claim 18, further comprising a control unit in communication with the encoder and the galvanometer, the control unit for controlling the speed of the focal point as a function of the speed of the web.

20. The system of claim 18, further comprising a control unit in communication with the encoder and the laser source, the control unit for controlling a power density of the laser beam as a function of the speed of the web.

21. A method for scoring or cutting a moving web to produce discreet scores or cuts in the web, the web moving in a machine direction, the method comprising:
   providing the moving web at a selected speed in the machine direction;
   generating a laser beam having a focal point positioned to provide either a score or cut in the web; and
   moving the focal point of the laser beam at a speed different than the selected speed for a selected distance, thereby producing a discreet score or cut in the web.

22. The method of claim 21 wherein moving the focal point of the laser beam is accomplished in a direction opposite the machine direction.

23. The method of claim 21 wherein moving the focal point comprises varying a speed of movement of the focal point.

24. The method of claim 21 wherein moving the focal point of the laser beam is accomplished in a plurality of directions.

25. The method of claim 21 wherein moving the focal point of the laser beam is accomplished while varying a speed of movement of the focal point.

26. The method of claim 21 wherein generating the laser beam is comprises varying a power density level of the laser beam.

* * * * *

UNITED STATES PATENT AND TRADEMARK OFFICE
CERTIFICATE OF CORRECTION

PATENT NO.        : 8,785,811 B2
APPLICATION NO.   : 12/892335
DATED             : July 22, 2014
INVENTOR(S)       : Bucklew et al.

It is certified that error appears in the above-identified patent and that said Letters Patent is hereby corrected as shown below:

In the Claims

Column 8, Claim 26, Line 24: "laser beam is comprises" should be --laser beam comprises--

Signed and Sealed this
Twenty-third Day of June, 2015

Michelle K. Lee
*Director of the United States Patent and Trademark Office*